US011909126B2

(12) United States Patent
Werntz et al.

(10) Patent No.: US 11,909,126 B2
(45) Date of Patent: Feb. 20, 2024

(54) OPTICAL SYSTEM FOR ENHANCED WIDE SCAN CAPABILITY OF ARRAY ANTENNAS

(71) Applicant: The Boeing Company, Chicago, IL (US)

(72) Inventors: Paul Christian Werntz, Long Beach, CA (US); Raenaurd Turpin, La Mirada, CA (US); Daniel Francis Mathews, San Gabriel, CA (US); Charles Youngshiuk Park, Torrance, CA (US)

(73) Assignee: The Boeing Company, Chicago, IL (US)

( * ) Notice: Subject to any disclaimer, the term of this patent is extended or adjusted under 35 U.S.C. 154(b) by 140 days.

(21) Appl. No.: 17/554,876

(22) Filed: Dec. 17, 2021

(65) Prior Publication Data

US 2023/0198142 A1 Jun. 22, 2023

(51) Int. Cl.
*H01Q 1/28* (2006.01)
*H01Q 3/26* (2006.01)
*H01Q 19/10* (2006.01)

(52) U.S. Cl.
CPC ........... *H01Q 3/2658* (2013.01); *H01Q 1/288* (2013.01); *H01Q 19/102* (2013.01)

(58) Field of Classification Search
CPC ........ H04B 7/00; H01Q 1/288; H01Q 3/2658; H01Q 19/102; H01Q 1/28
See application file for complete search history.

(56) References Cited

U.S. PATENT DOCUMENTS 3,541,553 A * 11/1970 Samuel ................ H04B 7/2041 342/353
5,309,167 A * 5/1994 Cluniat .................. H01Q 11/08 343/895

(Continued)

FOREIGN PATENT DOCUMENTS

CA 3108455 A1 * 8/2021 ............. H01Q 19/17
DE 19814048 A1 * 10/1999 ............. H01Q 1/288

(Continued)

OTHER PUBLICATIONS

Extended European Search Report, Application No. 22203667.5, dated Apr. 24, 2023, 9 pages.

(Continued)

*Primary Examiner* — Blane J Jackson
(74) *Attorney, Agent, or Firm* — Jordan IP Law, LLC

(57) ABSTRACT

Systems, apparatuses and methods provides for technology that generates, with a phased array of elements of an antenna system, an array element radiation pattern over a scan angle range, where the phased array of elements is spaced at a predetermined wavelength spacing. The technology reflects, with a reflector of the antenna system, the array element radiation pattern emitted from the phased array of elements to Earth, and establishes, based on a shape of the reflector, a predetermined magnification as a function of scan angle range so as to increase the field-of-view of the antenna system. The technology adjusts, based on the shape of the reflector, the array element radiation pattern, by increasing magnification relative to the scan angle range, to have a gain that increases with increases in scan angle relative to a boresight of the antenna system, and reflects, with the reflector, radiation from Earth to the phased array of elements.

20 Claims, 10 Drawing Sheets

(56) References Cited

U.S. PATENT DOCUMENTS

| | | | | |
|---|---|---|---|---|
| 10,658,756 | B1 * | 5/2020 | Marrero-Fontanez | H01Q 1/288 |
| 2002/0080085 | A1 * | 6/2002 | Kent | H01Q 19/13<br>343/840 |

FOREIGN PATENT DOCUMENTS

| | | | | | |
|---|---|---|---|---|---|
| EP | 3206279 | A1 | * | 8/2017 | H02J 11/00 |
| JP | 2006-242752 | A | | 9/2006 | |
| WO | WO-2018190794 | A1 | * | 10/2018 | H01Q 1/28 |
| WO | WO-2022103403 | A1 | * | 5/2022 | |

OTHER PUBLICATIONS

Romero-Pena, J. Samuel et al., “Irregular MultiFocal Reflector for Efficient mmWave Propagation in Indoor Environments,” 2020, 14th European Conference on Antennas and Propagation (EUCAP), EURAAP, Mar. 15, 2020.

* cited by examiner

This is an ~1 wavelength element feeding
The shaped refletor

OPTICAL SYSTEM FOR ENHANCED WIDE SCAN CAPABILITY OF ARRAY ANTENNAS

TECHNICAL FIELD

Examples generally relate to generating array element radiation patterns with an antenna system over a scan range to compensate for length of travel of the array element radiation patterns. More particularly, examples relate to increasing a gain of the array element radiation patterns as a scan angle relative to a boresight of the antenna system increases.

BACKGROUND

Communication satellites are employed to receive electromagnetic signals from ground components, process the signals and/or retransmit the signals to other ground components. The signals contain various types of information ranging from voice, video, data, images, etc. for communication between various ground components through the satellite. The satellite can thus both receive information and transmit information.

Satellites employ antennas to transmit and receive signals. Antennas have the ability to direct the signals to a specific location and the ability to tune to signals emanating from a specific location. Antennas can transmit signals having specific frequencies to a specific location by focusing the signals into a radiation pattern. Similarly, antennas tune to the same radiation pattern to receive signals with the given frequencies emanating from the specific location. The gain of an antenna is the measure of the ability of an antenna to increase the power to a given area by reducing the power to other areas (e.g., a sensitivity of the antenna). The gain can be related to the size of the radiation pattern and is related to a data rate that the antenna can support (e.g., the higher the gain the higher the data rate).

SUMMARY

In accordance with one or more examples, an antenna system comprises a phased array of elements spaced at a predetermined wavelength spacing, the phased array of elements being configured to generate an array element radiation pattern over a scan angle range. The antenna system further comprises a reflector to reflect the array element radiation pattern from the phased array of elements to Earth, the reflector having a shape configured to establish a predetermined magnification as a function of scan angle range so as to increase the field-of-view of the antenna system, where the shape of the reflector is further configured to adjust the array element radiation pattern, by increasing magnification relative to the scan angle range, to have a gain that increases with increases in scan angle relative to a boresight of the antenna system. The phased array of elements is positioned at a feed location to receive radiation from Earth reflected by the reflector.

In accordance with one or more examples, a method comprises generating, with a phased array of elements of an antenna system, an array element radiation pattern over a scan angle range, wherein the phased array of elements is spaced at a predetermined wavelength spacing, and reflecting, with a reflector of the antenna system, the array element radiation pattern emitted from the phased array of elements to Earth. The method further comprises establishing, based on the shape of the reflector, a predetermined magnification as a function of scan angle range so as to increase the field-of-view of the antenna system, adjusting, based on the shape of the reflector, the array element radiation pattern, by increasing magnification relative to the scan angle range, to have a gain that increases with increases in scan angle relative to a boresight of the antenna system and reflecting, with the reflector, radiation from Earth to the phased array of elements.

BRIEF DESCRIPTION OF THE DRAWINGS

The various advantages of the examples will become apparent to one skilled in the art by reading the following specification and appended claims, and by referencing the following drawings, in which:

DETAILED DESCRIPTION

Figure 1A:
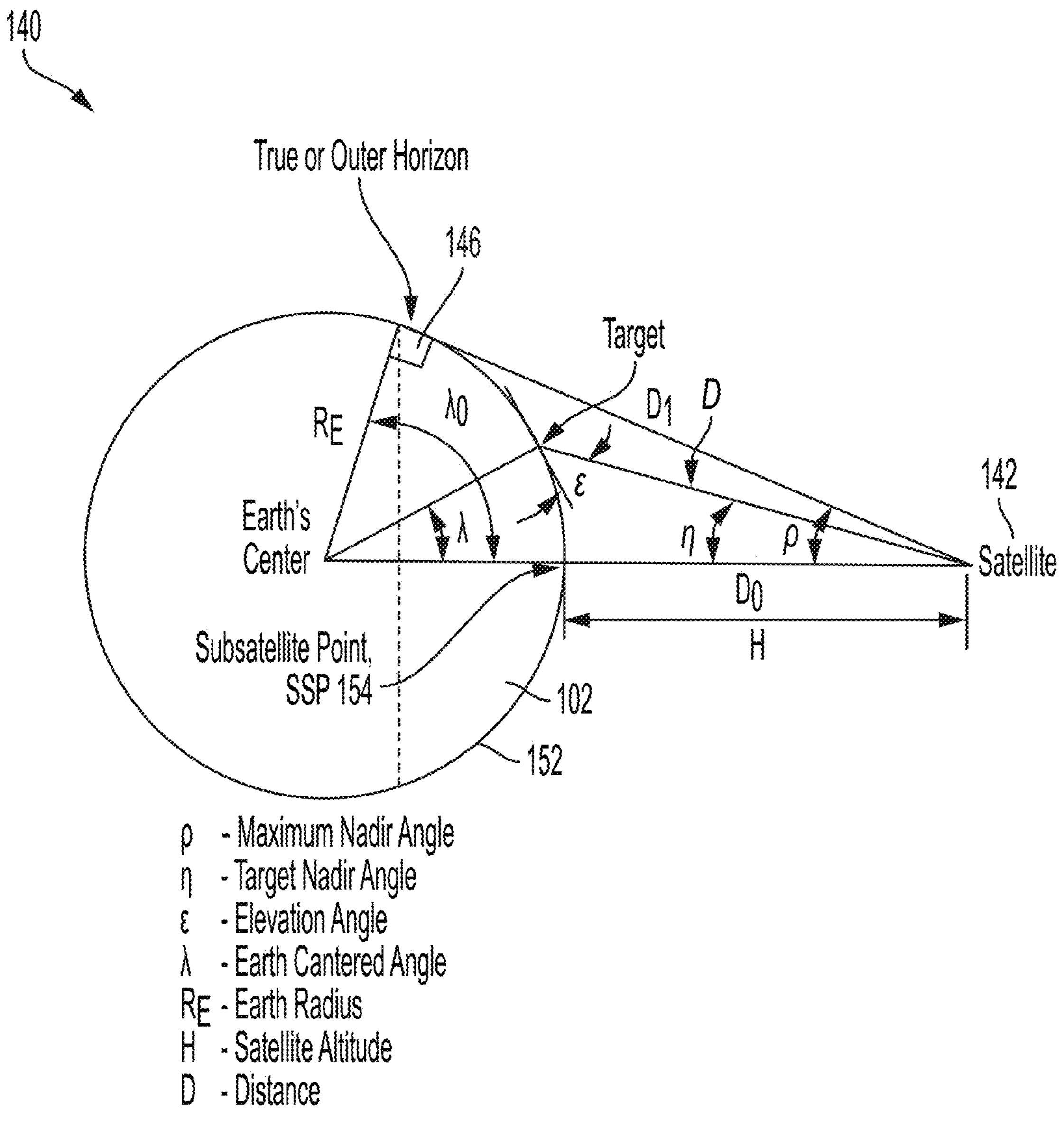
FIG. 1A is an example of a satellite transmitting an array element radiation pattern.

FIG. 1A illustrates a satellite and Earth geometry 140 that includes a satellite 142 (e.g., an antenna system including a phased array of elements to generate an array element radiation pattern and a reflector to reflect the array element radiation pattern). The satellite 142 can transmit signals to an area on a planetary body such as Earth 152. Paths of the signals (e.g., electromagnetic waves) from the satellite 142 vary in distance due to the spherical nature of the Earth 152. In a typical satellite, such different path lengths result in different flux densities throughout the area resulting in inconsistent performance throughout the area and particularly degraded performance at a perimeter 146 of the area. The satellite 142 of present examples provides consistent flux density throughout the area resulting in an enhanced performance that is more efficient (e.g., less power and hardware).

In this example, the satellite 142 transmits an electromagnetic radiation pattern (which can also be referred to as an array element radiation pattern) to the Earth 152. As illustrated, a shape of the Earth 152 is spherical thus resulting in different distances between the satellite 142 and positions on the Earth 152. For example, a path length Do between the satellite 142 and sub satellite point 154 (e.g., a nadir) of the Earth 152 is less than a path length Di between the satellite 142 and a perimeter 146 of the Earth 152. The subsatellite point 154 is at a center of coverage area 102 (an illumination area demarcated by the dashed line) and a boresight of the satellite 142. The increase in the path length Di relative to the path length Do results in increased spreading of radio-frequency (RF) path loss to targets at the perimeter 146 than at the subsatellite point 154. Furthermore, power loss increases as the path length increases.

Thus, in typical satellites, the flux density at the edge of coverage area 102 at the perimeter 146 is less than flux density at the center of coverage area 102 at sub satellite point 154. To address the above, the satellite 142 described herein adjusts, with a reflector of the satellite 142, the array element radiation pattern to have a gain that increases as a scan angle relative to a boresight of the satellite 142 increases. The scan angle can be defined relative to boresight (e.g., axis of maximum gain) of the satellite 142. For example, a 0 degree scan angle would be aligned with the boresight while a 60 degree scan angle would form a 60 degree angle with the boresight.

Figure 1B:
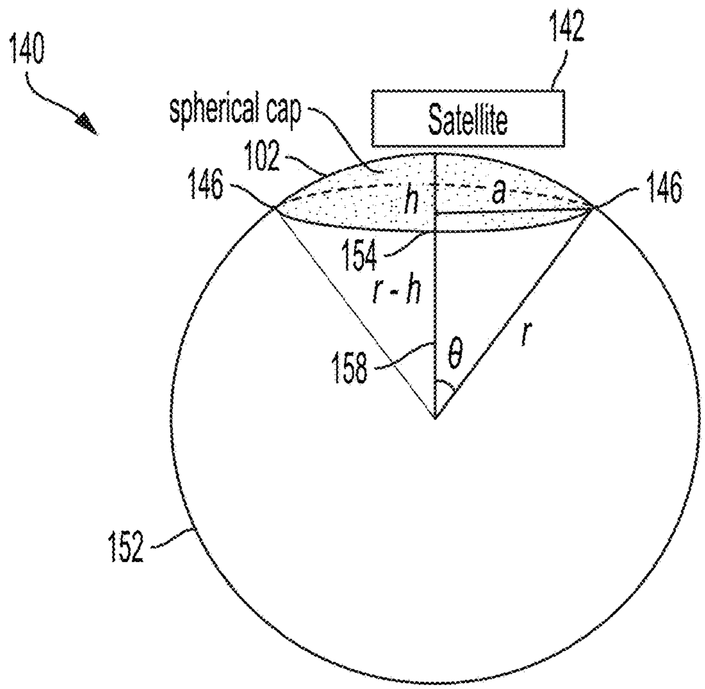
FIG. 1B is an example of a coverage area of the satellite.

The above can also compensate for the greater area at the perimeter 146. For example, a coverage at the perimeter 146 is larger than an area at the sub satellite point 154. For example, in FIG. 1B an entire coverage area 102 of the satellite is illustrated as a spherical cap. The coverage area 102 increases in size with increasing distance away from the subsatellite point 154. As shown, the size of the coverage area 102 at the perimeter 146 is greater than the size of the coverage area at the subsatellite point 154. That is, the area of the Earth 152 covered for a given scan angle can be determined based on following Equation I:

$$\alpha=\pi(\alpha 2+h2) \qquad \text{Equation I}$$

In Equation I, the area is "a" of a circular portion of the coverage area 102 at height h. In Equation I, a2 is a radius of the circular portion at the height h. For example, a straight line 158 is a radius of the Earth 152 and is also oriented towards the satellite 142. Hypothetically, if the straight line 158 extended farther out of the Earth 152, the straight line 158 would intersect the satellite 142. H2 is a distance (e.g., H) along the straight line 158 that extends between the circular portion and the surface of the Earth 152. Thus, cross-sections at smaller heights H can have reduced radii and correspondingly smaller areas.

To increase the gain at the perimeter 146 relative to the subsatellite point 154, the satellite 142 (e.g., an antenna system) generates, with the phased array of elements, an array element radiation pattern over a scan angle range, where the phased array of elements is spaced at a predetermined wavelength spacing. The satellite 142 reflects, with a reflector of the satellite 142, the array element radiation pattern emitted from the phased array of elements to earth. The satellite 142 establishes, based on a shape of the reflector, a predetermined magnification as a function of scan angle range so as to increase the field-of-view of the antenna system and adjusts, based on the shape of the reflector, the array element radiation pattern, by increasing magnification relative to the scan angle range, to have a gain that increases with increases in scan angle relative to a boresight of the satellite 142. The satellite 142 further reflects, with the reflector, radiation from Earth to the phased array of elements. Thus, the gain at the boresight of the antenna at the sub satellite point 154 is less than at the perimeter 146. In doing so, beams, formed by electromagnetic radiation from the satellite 142, at the perimeter 146 and subsatellite point 154 have a similar and/or same size.

In some examples, the predetermined magnification of the satellite 142 is a negative magnification. The predetermined magnification can be within a range from a negative magnification of −3 for small scan angles (e.g., from —half the maximum scan angle to half the maximum scan angle) up to a positive magnification of +2 for large scan angles (angles greater than half the maximum scan angle to the maximum scan angle, and angles less than —half the maximum scan angle to a —maximum scan angle), and is a function of scan angle range. For example, if the maximum scan angle is 60 degrees, the small scan angles would include from −30 to 30 degrees and the large scan angles would include −60 to −31 degrees and 31 to 60 degrees. In some examples, the negative magnification is adjusted to correspond to gain that would range from −1.5 to +10 or around 11.5 dB change in gain, which corresponds to a change in magnification of 3.8. The magnification factor for an inverted parabolic type surface reflector for the magnification can range −3 to +0.8. The relationship is described by Magnification=−3+10^((gain-gain max)/20) where "−3" corresponds to the magnification. For a surface that is initially flat, the ideal magnification would range from 0 to +3.8 to provide sufficient gain.

In some examples, the satellite 142 increases, with the reflector, the scan angle range by a predetermined amount of degrees, where the shape of the reflector has a slope that is equal to half the amount of the predetermined amount of degrees for small scan angles (e.g., from —half the maximum scan angle to half the maximum scan angle) and transitions to less negative magnification at wider scan angles (angles greater than half the maximum scan angle to the maximum scan angle, and angles less than —half the maximum scan angle to a —maximum scan angle). For example, if the maximum scan angle is 60 degrees, the small scan angles would include from −30 to 30 degrees and the large scan angles would include −60 to −31 degrees and 31 to 60 degrees. It is worthwhile to note that the reflector can be an off-set reflector or an on-axis reflector. In some examples, the phased array of elements are spaced at a predetermined wavelength spacing that is configured for scanning from a −30 degree scan angle from the boresight to a 30 degree scan angle from the boresight, and the reflector has a predetermined magnification of −2 (e.g., near the center) to extend the −30 degree scan angle to a −60 degree scan angle from the boresight and the 30 degree scan angle to a 60 degree scan angle from the boresight.

In some examples, the phased array of elements are spaced at one wavelength apart. In some examples, the phased array of elements are spaced at a predetermined wavelength spacing that is configured for scanning from a −20 degree scan angle from the boresight to a 20 degree scan angle from the boresight, and the reflector has a predetermined magnification of −3 (e.g., near the center) to extend the −20 degree scan angle to a −60 degree scan angle from the boresight, and extend the 20 degree scan angle to a 60 degree scan angle from the boresight. In some examples, the satellite 142 reflects, with the reflector, the array element radiation pattern to have a first gain in a direction of perimeter 146 (which can be referred to as Earth Perimeter) relative to the satellite 142, and a second gain in a direction of nadir relative to the satellite 142, where the first gain is greater than the second gain. In some examples, the reflector has a substantially inverse parabolic shape near the center and becomes less curved near the edge, and the array element radiation pattern reflected by the reflector has a substantially uniform flux density (e.g., an amount of flux per unit area) on the Earth 152. In some examples, the satellite 142 is a low-Earth orbit satellite.

Figure 1C:
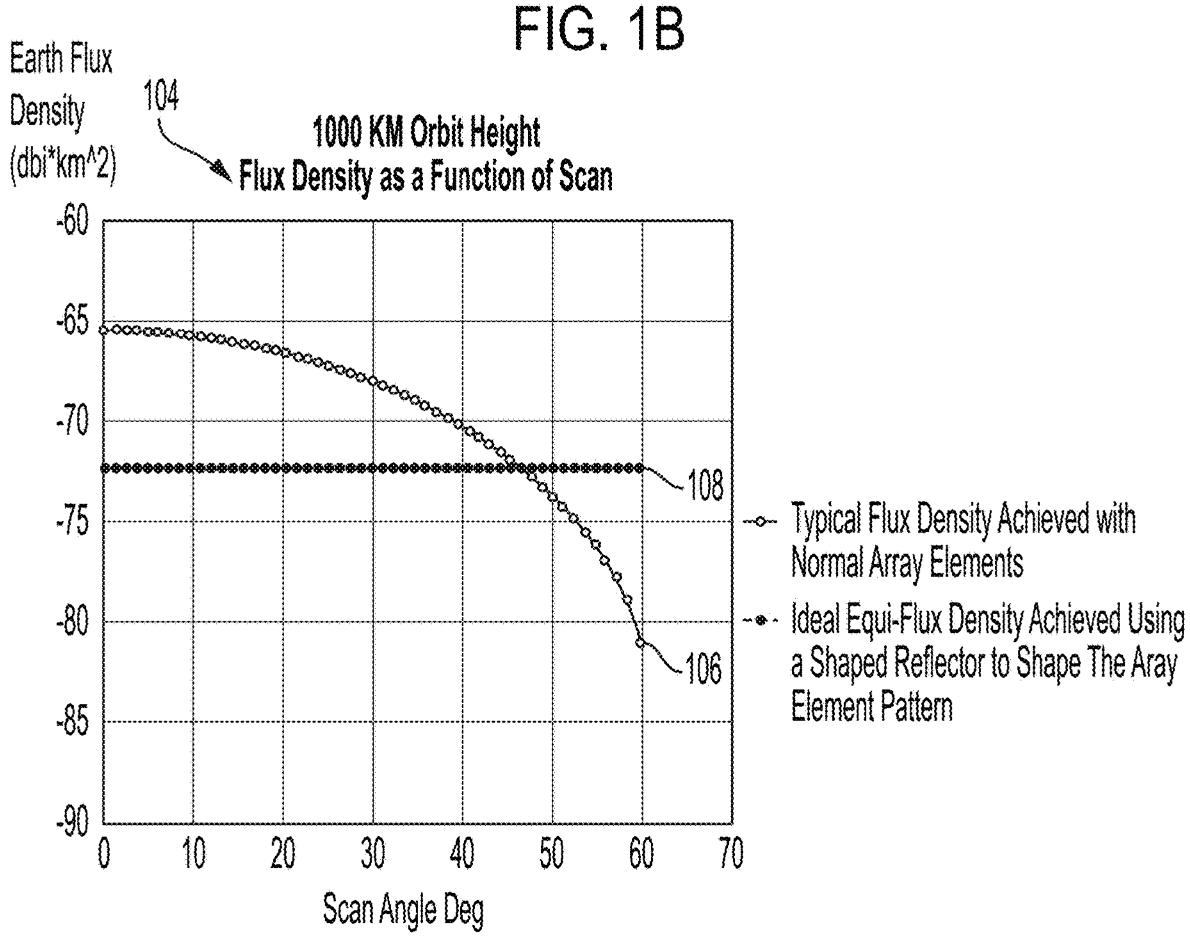
FIG. 1C is an example of a graph illustrating Earth flux density with respect to scan angle.

FIG. 1C illustrates a graph 104 illustrating Earth flux density with respect to scan angle (in degrees) of a satellite. The scan angle can also correspond to the "theta" illustrated in FIG. 1B. A comparative array element (which can be part of a typical satellite) output is illustrated by curve 106 while a phased array of elements according to examples as described herein are illustrated by line 108. That is, the satellite 142 can emit the array element radiation pattern to generate the Earth flux density of line 108.

The comparative array element can have a 3 to 4 dB of roll-off at the edge of coverage in addition to the spreading loss. With the comparative array element, as illustrated in curve 106, the flux density on the Earth is much lower at the edge of coverage (60 scan angle degrees) as compared to on boresight (0 scan angle degrees). In contrast, in examples as described herein and shown in line 108, the flux density for a given element efficiency is flat and corresponds to around a 3 dB improvement in the average flux density on Earth. Furthermore, the line 108 requires less power to generate than the curve 106. That is, an area (e.g., an integral) under the line 108 is less than the area (e.g., an integral) of the curve 106, thus enhancing the efficiency of the satellite 142 and reducing the size and power usage of the satellite 142.

Thus, the line 108 provides a consistent flux density throughout a coverage area. As noted, the satellite 142 generates the array element radiation pattern to provide an Earth flux density that corresponds to the line 108. Doing so can provide a more consistent experience. For example, since the flux density is consistent throughout the line 108, a ground antenna (that can be moving) will operate with the same signal strength throughout the entire coverage area 102 of the satellite 142 without requiring compensation by the ground antenna. Furthermore, since ground antennas are reciprocal and are dictated by the least sensitive power path (which is usually at the perimeter 146 of the coverage area 102), the ground antennas do not need as significant transmission power and can be reduced in size and weight, while benefitting from increased energy efficiency since the ground antennas do not need as great power to receive and transmit to the satellite 142.

Moreover, the satellite 142 is more efficient by providing the Earth flux density according to the line 108. For example, the satellite 142 can be reduced in size and power since the satellite 142 requires less power to operate and is more efficient. For example, the satellite 142 can have an amplifier that is reduced in power and weight. A typical array element of a typical satellite, that generates an Earth flux density according to the curve 106, can attempt to increase power as gain diminishes with increasing scan angle. Doing so results in increased circuitry, complexity and power.

Figure 1D:
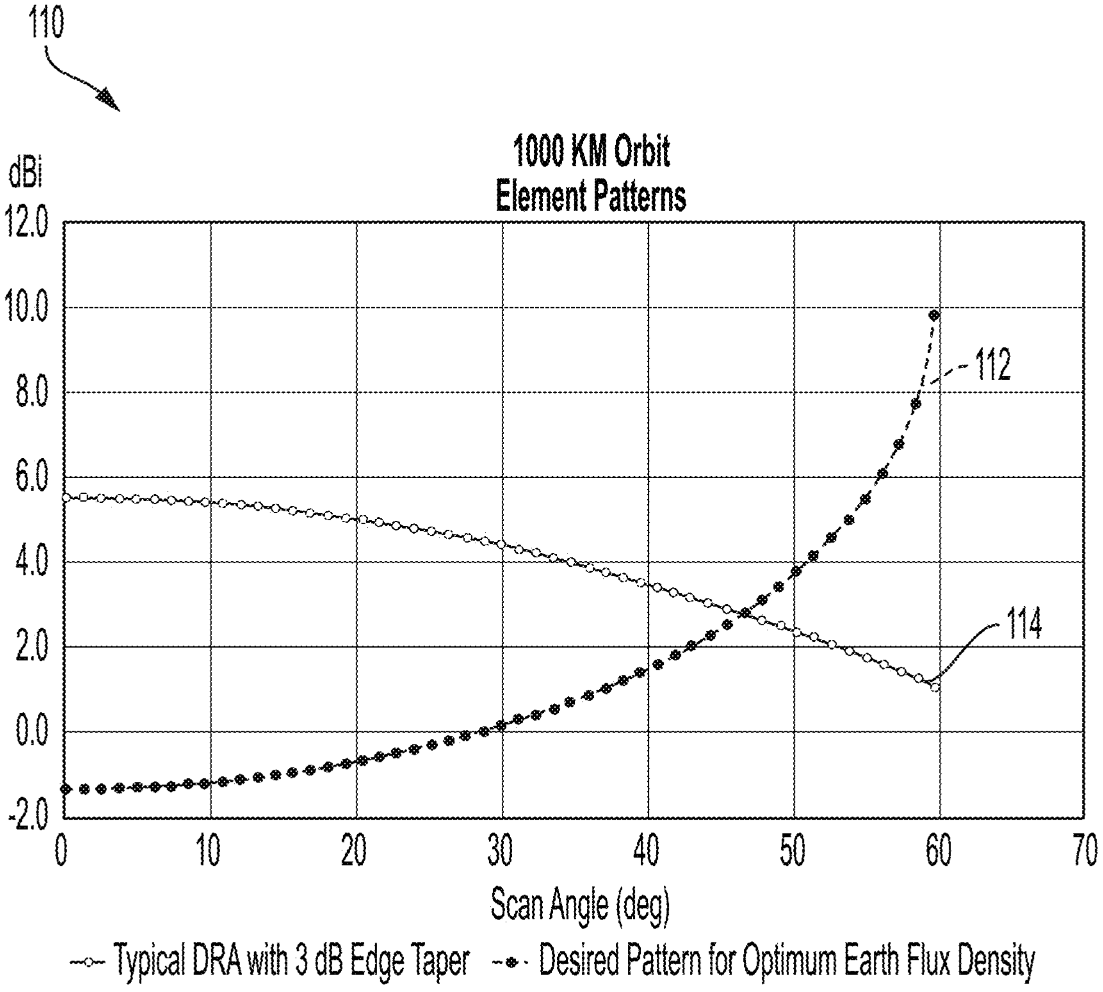
FIG. 1D is an example of a directivity versus scan profile.

FIG. 1D illustrates a directivity versus scan profile 110. The directivity versus scan profile 110 can map a scan angle with respect to strength of signal decibels relative to isotropic (dBi) emitted by a satellite from a 1000 KM orbit. Thus the directivity versus scan profile 110 is dBi of the array element radiation pattern that is emitted by a satellite with respect to scan angle.

The satellite 142 can emit an array element radiation pattern having characteristics (e.g., a strength to scan angle) that matches the first curve 112. Doing so results in a radiation flux being generated on the Earth 152. In this example, satellite 142 generates a signal according to the first curve 112 to provide a uniform radiation flux on the Earth 152 which matches the line 108 (FIG. 1C). As already noted in the discussion of the line 108, an exemplary array element radiation pattern provides a constant flux density value as a function of scan. On reception, such a gain pattern will receive a constant power from ground stations with identical effective radiated power (ERIP) anywhere on the Earth. Thus, the array element radiation pattern of examples as described herein is shown as first curve 112. The first curve 112 increases in strength of signal dBi with scan angle. As illustrated the first curve 112 naturally increases in strength towards the perimeter 146. The first curve 112 can be generated by a satellite towards Earth, and the resulting Earth flux density on Earth would be the line 108.

In contrast, in a comparative example, a comparative satellite generates emit an array element radiation pattern according to second curve 114 that diminishes in dBi with increasing scan angle to result in diminishing and inconsistent Earth flux densities. That is, emission of an array element radiation pattern according to the second curve 114 would result in the Earth flux density of the curve 106 which is inconsistent and degrades performance Moreover, the approach as described in examples scales for all orbit heights. For orbit heights greater than 100 KM a maximum scan angle can be reduced, but a desired relative pattern increase from boresight to max scan remains similar to as described with respect to first curve 112.

As illustrated in FIG. 1D, an ideal gain pattern corresponds to the first curve 112 and ranges from −1.5 to +10 or a 11.5 dBi change in gain. Such a gain change corresponds to a change in magnification of 3.8. The magnification factor for the inverted parabolic type surface for the ideal magnification would range from −3 to +0.8 to follow the profile of the first curve 112 with the relationship M=−3+10^((gain-gain max)/20). From a surface of the reflector that is flat (e.g., at a center of the reflector) the ideal magnification would increase from 0 to +3.8 away from the flat surface towards the edges to follow the profile of the first curve 112 with the relationship M=0+10^((gain-gain max)/20). Thus, a magnification of the reflector can consistently change from a center to an edge to control gain.

Figure 2:
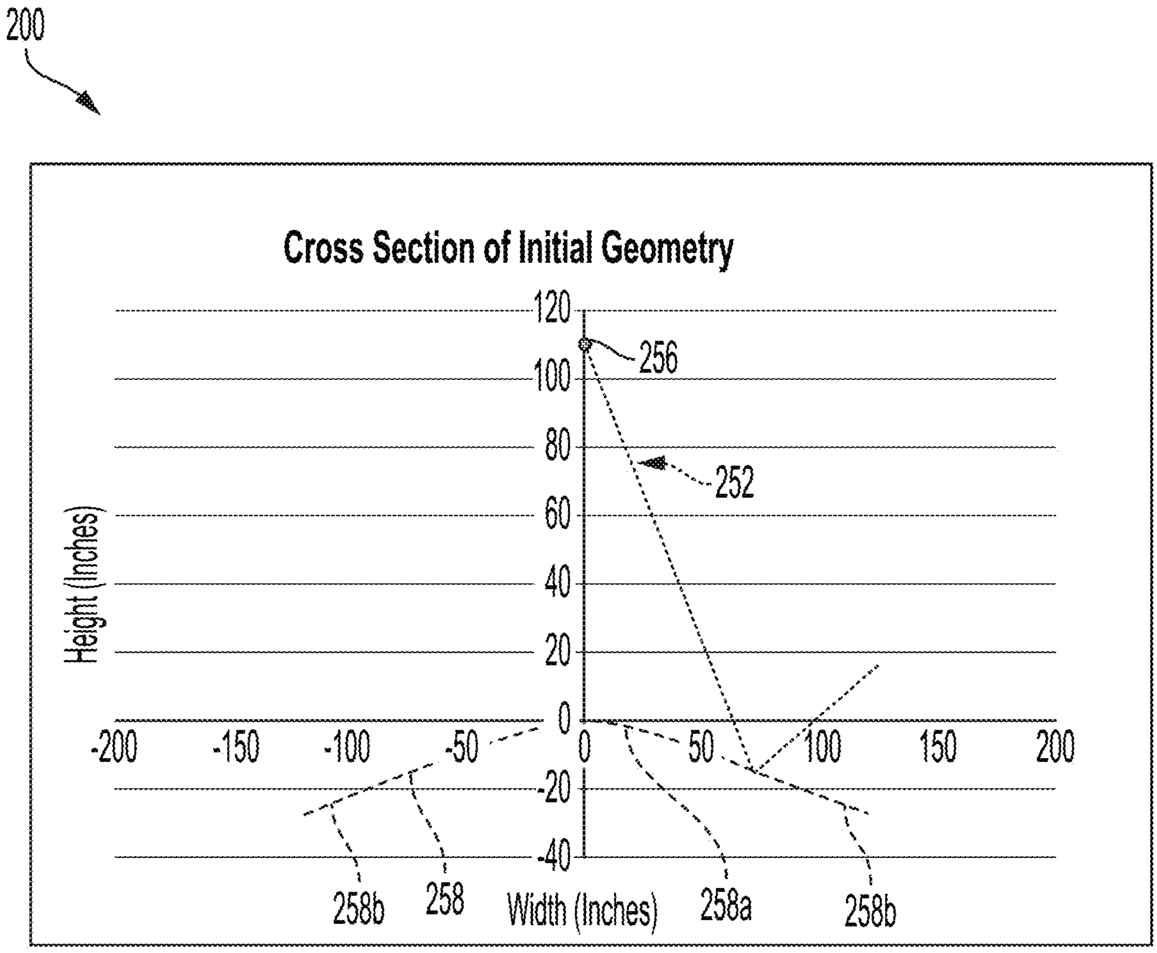
FIG. 2 is an example of a cross-section of initial geometry of a feed and satellite antenna.

FIG. 2 illustrates a cross-section of initial geometry 200 of a feed and satellite antenna. The cross-section of initial geometry 200 includes a y-axis that corresponds to height, and an x-axis that corresponds to width. This example includes a reflector feed geometry that includes a reflector 258 and a phased array of elements 256 (e.g., a feed array or array elements). This example has an on-axis reflector geometry. The phased array of elements 256 is designed to scan to 30 degrees from boresight (0 scan angle) with approximately a −3 dBi difference across scan angles. That is, the dBi at the boresight is 3 dBi less than at the scan angle of 30 degrees. The phased array of elements 256 emits a ray 252 at an approximate scan angle of 30 degrees.

The reflector 258 reflects the ray 252 (and other unillustrated rays) towards the Earth to generate an array element radiation pattern. Since the ray 252 strikes the reflector 258 at an angle of 30 degrees, the ray 252 is reflected 30 degrees increasing the scan angle range to 60 degrees (i.e., the angle of reflection is equal to the angle of incidence). The reflector 258 can have a starting magnification factor of around −2 to extend the scan range to 60 degrees from boresight. The reflector 258 can have a slope of around 15 degrees. That is, the reflector 258 is configured to increase the scan angle range by a predetermined amount of degrees (e.g., 30 degrees), and corresponding the shape of the reflector 258 has a slope (e.g., 15 degrees) that is equal to half the amount of the predetermined amount of degrees. Doing so enables the reflector 258 to increase the scan angle range by a specified range.

In this example, the reflector 258 has an apex at a center portion 258*a* that is gradually flattened towards the zero width. The outer portions 258*b* have a slope of 15 degrees and protrude from the center portion 258*a* to reduce or eliminate grating globes. Thus, the overall shape of the reflector 258 is a substantially inverse parabolic shape near the center and becomes less curved near the edge.

A spacing of elements of the phased array of elements 256 can be selected to minimize or eliminate grating lobes. That is, if the spacing elements of the phased array of elements 256 are too large relative to a total scan area, grating lobes can occur due to the periodic nature of rays emitted and received by the phased array of elements 256 such that secondary images (aliasing) occur. An increase in scan area of the phased array of elements 256 corresponds to a reduction in spacing of the elements.

In examples as described herein, the phased array of elements 256 can have a smaller scan area that is increased by the reflector 258. Thus, the phased array of elements 256 can have larger distance between the element than other designs, leading to reduced circuitry and complications that arise with elements that are spaced closer together in the other designs. That is, as opposed to designing the elements of the phased array of elements 256 to be spaced apart by ½ lambda (as would be case for a 60 degree scan area), the phased array of elements 256 can be designed to be spaced apart by 1 lambda (for a 30 degree scan area that is increased by 30 degrees by the reflector 258). The increased spacing permits larger elements to be utilized in the phased array of elements 256 thereby reducing complicated circuitry that is associated with smaller elements.

Thus, element spacing can be increased for a given coverage region, reducing mutual coupling and increasing the available space to place necessary element electronics. For example an array of elements spaced 1.1 wavelength apart can have a scan region limited to around ±30 deg due to the grating lobe entering this region at maximum scan. An array of elements spaced 1 wavelength apart, illuminating a reflector of magnification −2, will have a grating lobe ~±60 degrees from boresight, and can illuminate a field of view normally requiring an array of elements spaces ½ wavelength apart. Some examples herein include an array of elements spaced 1 wavelength apart feeding a reflector of magnification −2, before shaping, to be used over a ±60 deg field of view. Relative to such conventional designs, examples as described herein can have less elements additionally due to the negative magnification of the reflector and spacing of the elements.

Figure 3:
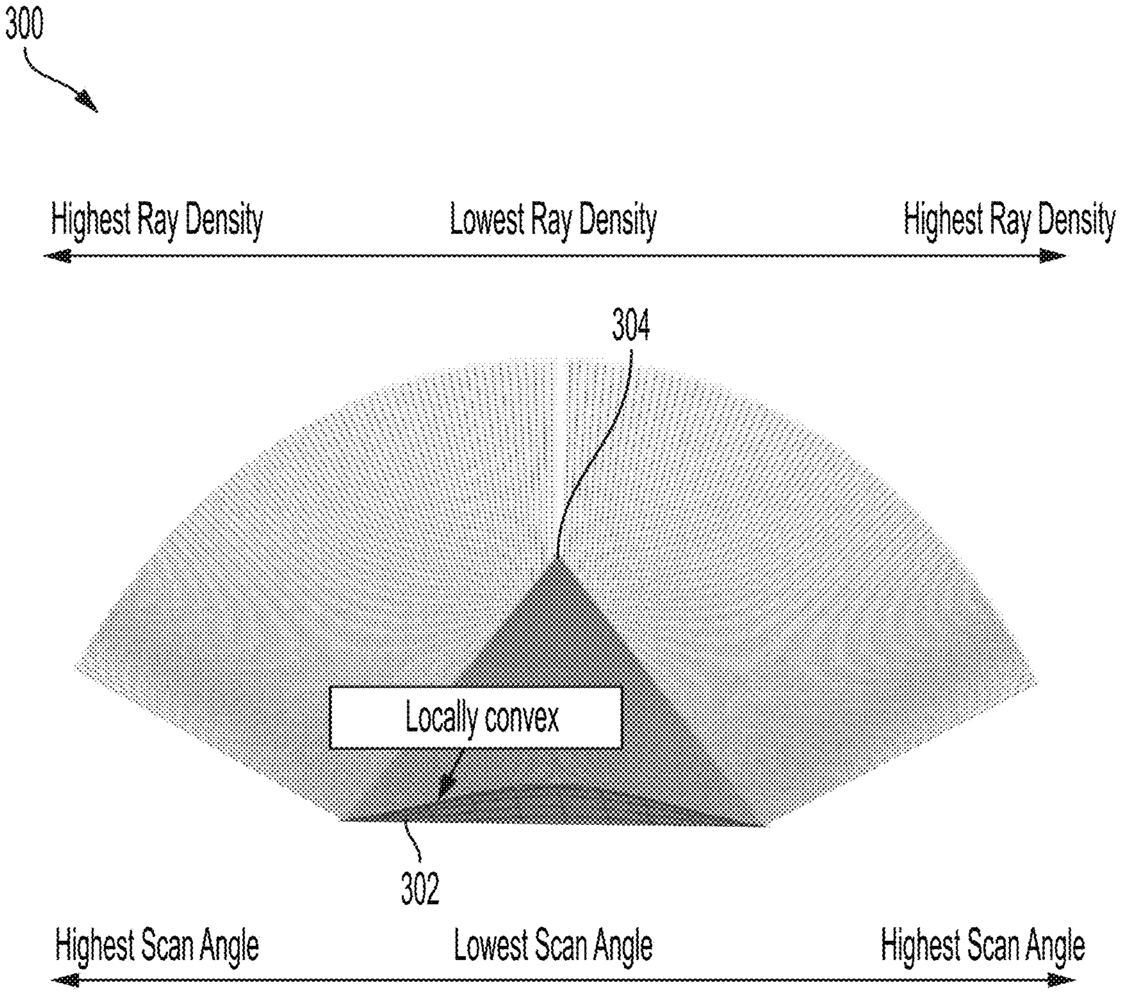
FIG. 3 is an example of a diagram of ray densities.

FIG. 3 illustrates a diagram 300 of ray densities (paths of electromagnetic radiation) according to some examples. In this example, a phased array of elements 304 emits rays towards a mirror 302 (e.g., a single on-axis reflector) having an inverse parabolic shape with a local convex. The rays are reflected by the mirror 302 to increase the scan angle and reflect towards Earth. The mirror 302 naturally focuses more of the rays towards the higher scan angles as a consequence of the angles of the rays that impinge of the mirror 302. As illustrated, the ray density increases with increasing scan angle and diminishes with reduced scan angle.

Figure 4A:
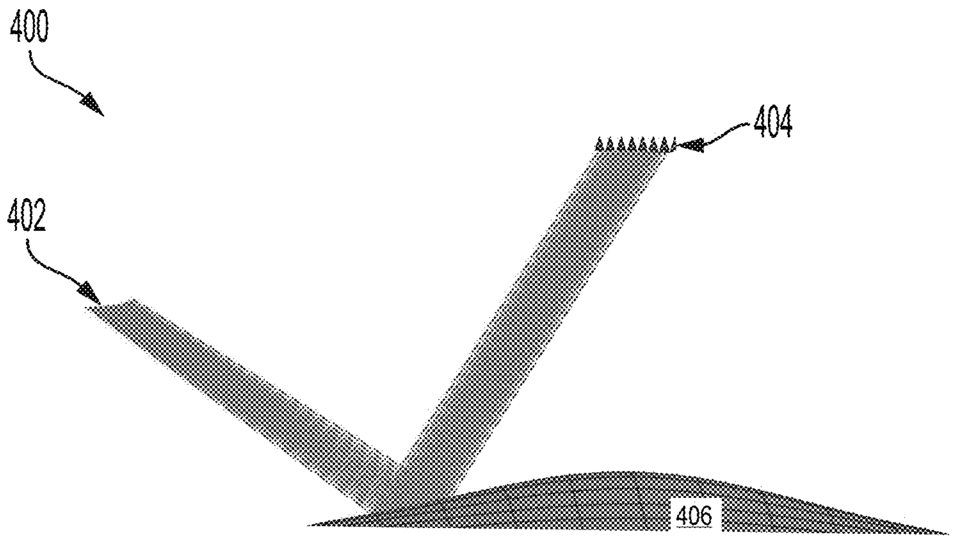
FIG. 4A is an example of an axis-symmetric satellite antenna.

FIG. 4A shows an axis-symmetric satellite antenna 400. A phased array of elements 404 transmit electromagnetic radiation 402 to a reflector 406. The reflector 406 reflects the electromagnetic radiation 402 to Earth to generate an array element radiation pattern. For each scan direction, an excitation of the phased array of elements 404 is set using conjugate field matching to maximize directivity. Other phase and amplitude optimization techniques can be used as well and do not result in aperture blockage.

Figure 4B:
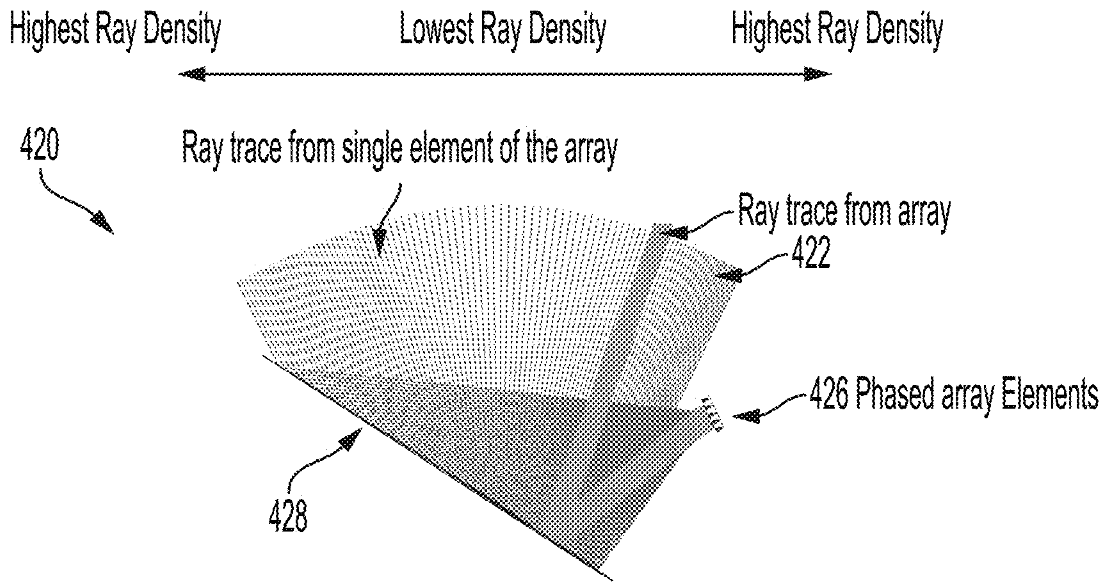
FIG. 4B is an example of an offset array feed and satellite antenna.

FIG. 4B illustrates an offset array feed and satellite antenna 420. The offset array feed and satellite antenna 420 implements examples as described herein and does not have aperture blockage. With an offset configuration RF performance can be symmetric as described above and with no blockage. A phased array of elements 426 projects electromagnetic radiation to the reflector 428 that is reflected as rays 422. The process for generation of the electromagnetic radiation to the reflector 428 and reflection thereof is the same for both transmit or receive due to reciprocity. The reflector 428 (e.g., single off-set reflector) reflects the electromagnetic radiation into rays that have highest ray density towards the edge and decreasing ray density towards a center. Thus the processes described herein can be applied to off-set and axis symmetric reflectors. The process can be applied to reflectors with different magnification factors as well.

Figure 5A:
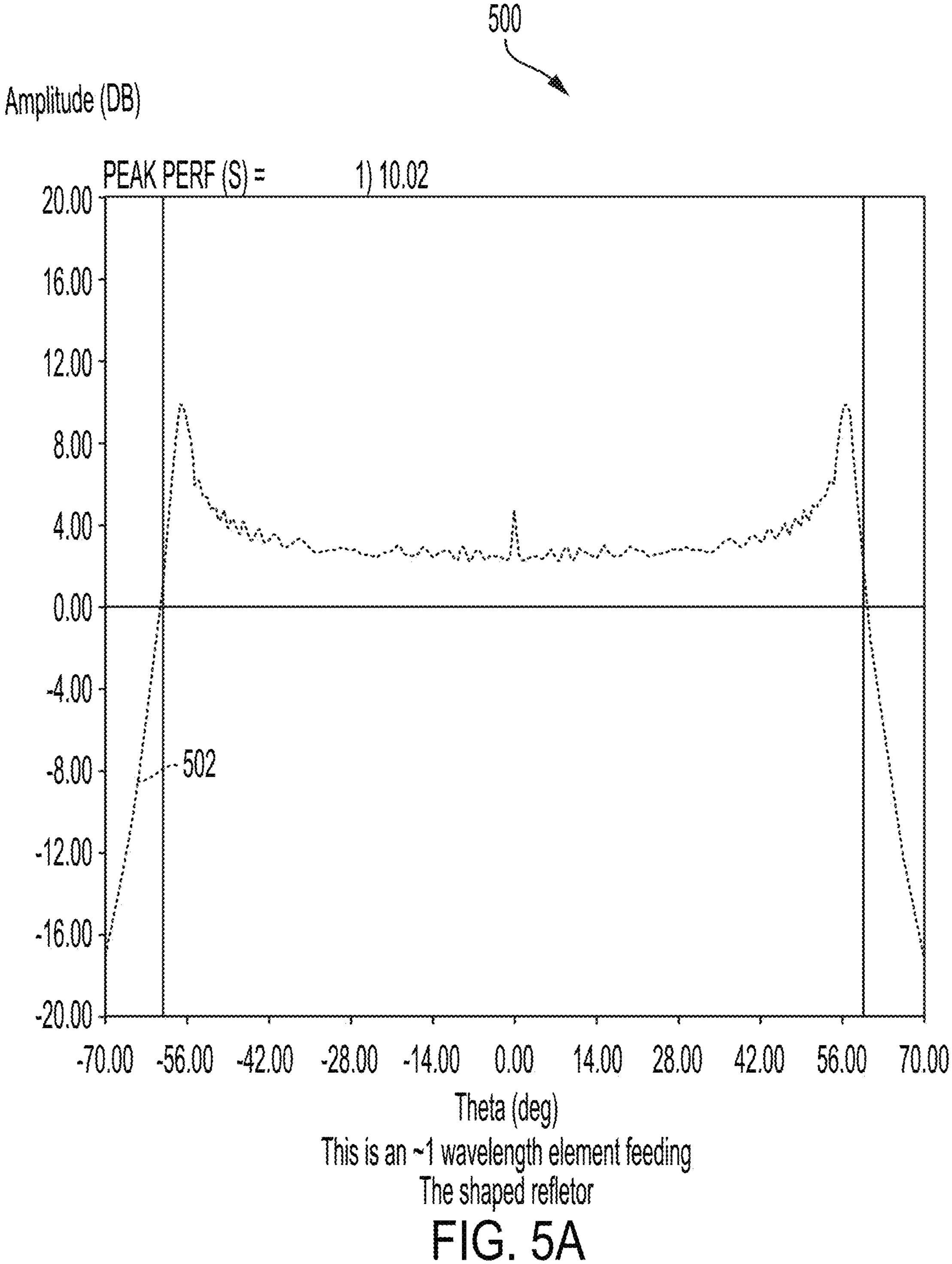
FIG. 5A is an example of a graph of an element radiation pattern of an axis-symmetric satellite antenna configuration.

FIG. 5A illustrates a graph 500 of an element radiation pattern 502. The graph 500 amplitude and a scan angle (theta) that is used to feed a reflector. The element radiation pattern 502 can have around 1 wavelength in diameter. The axis-symmetric satellite antenna can generate the element radiation pattern 502.

Figure 5B:
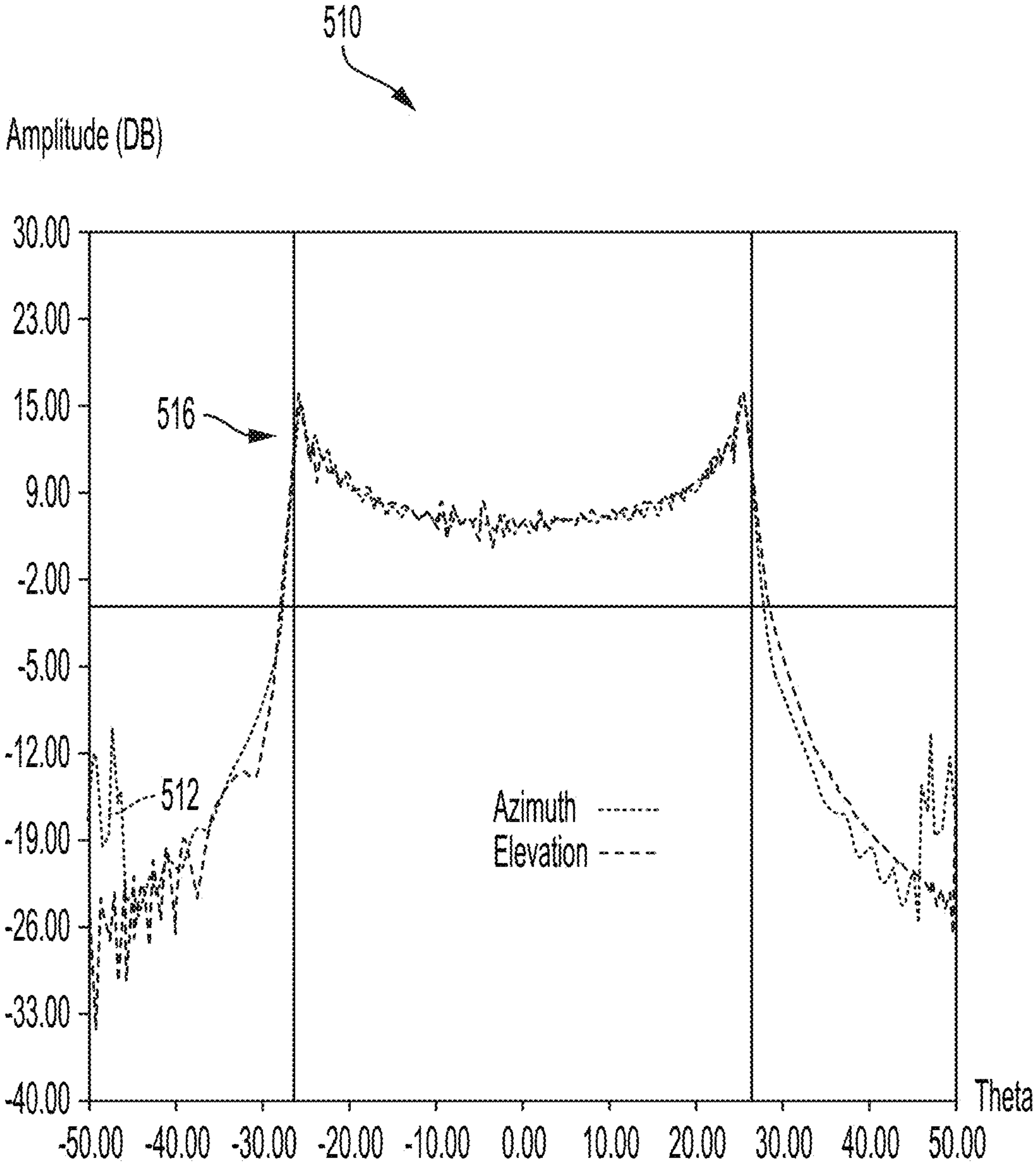
FIG. 5B is an example of a graph of an element radiation pattern of an offset satellite antenna configuration.

FIG. 5B illustrates a graph 510 of an element radiation pattern 516. The graph 510 amplitude and a scan angle (theta) that is used to feed a reflector. The element radiation pattern 512 can have around 1 wavelength in diameter. The offset array feed and satellite antenna 420 can generate the element radiation pattern 516.

Figure 6:
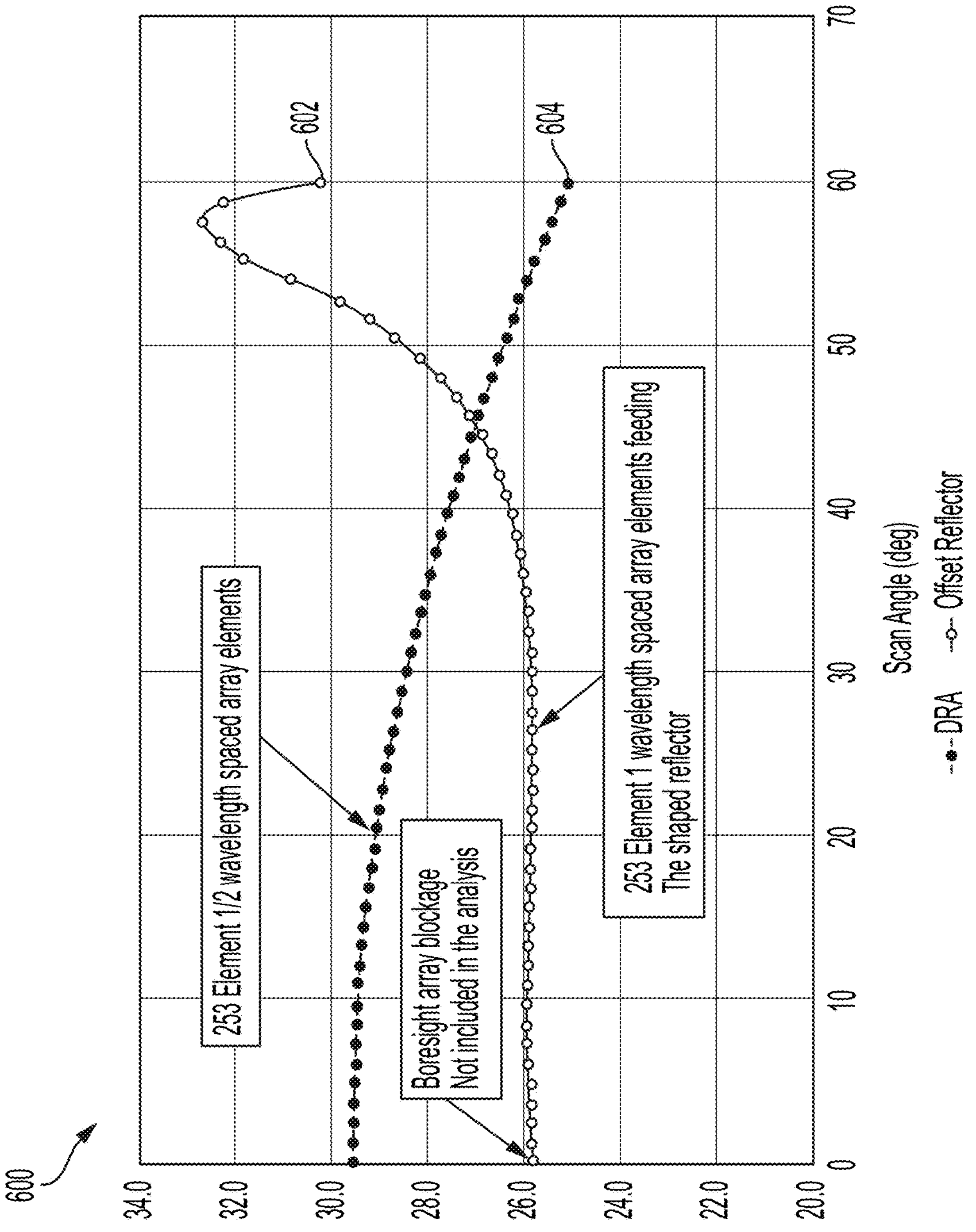
FIG. 6 is an example of a graph of scan angle and composite pattern showing gain with array excitation enhanced to scan to each direction shown.

FIG. 6 illustrates a graph 600 of scan angle and composite pattern showing gain with array excitation enhanced to scan to each direction shown. Curve 602 corresponds to 253 elements with ½ wavelength spaced array elements feeding a shaped reflector. Curve 604 corresponds to 253 elements with 1 wavelength spaced array elements feeding a shaped reflector.

Figure 7:
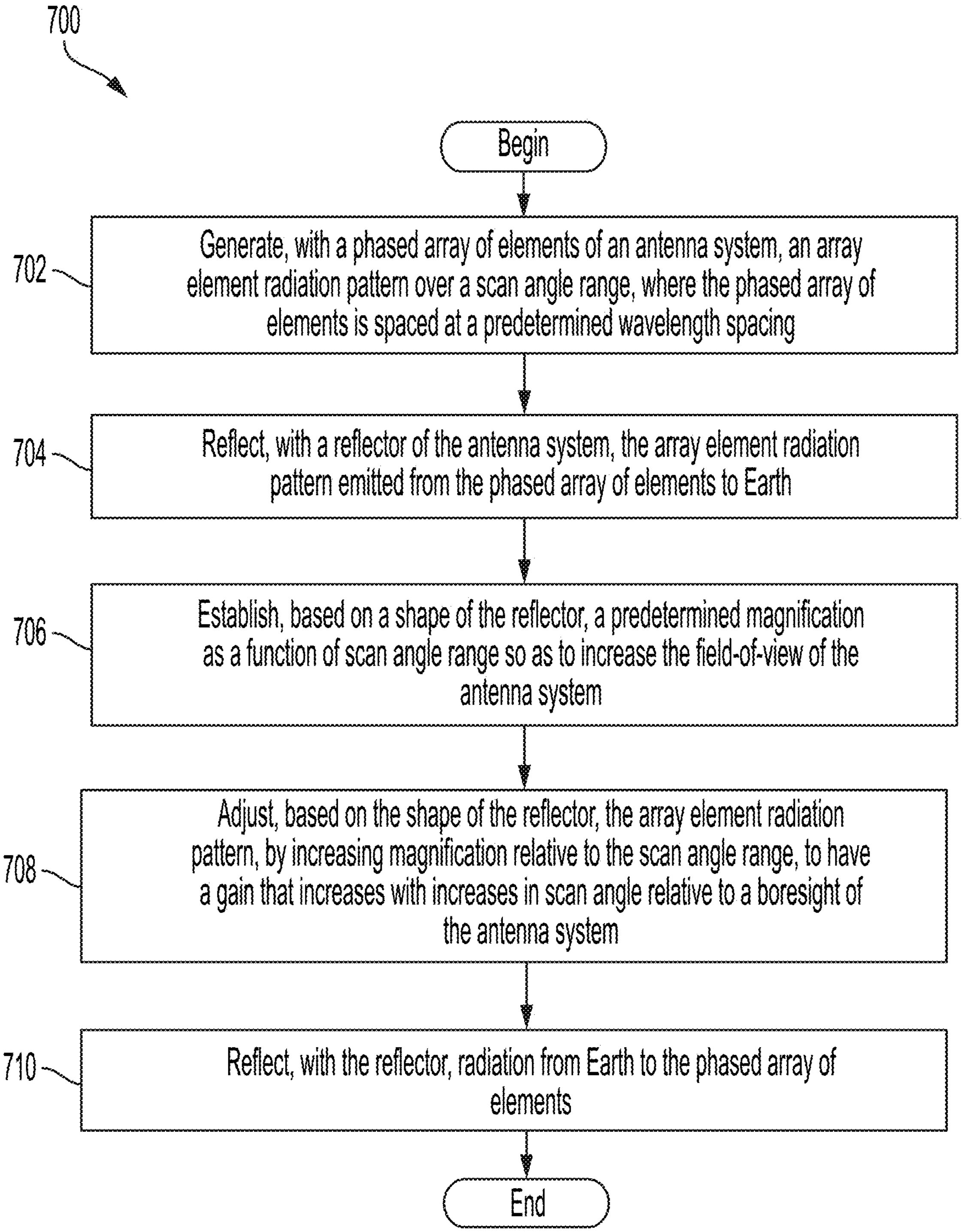
FIG. 7 shows a method of array element radiation pattern generation according to some examples.

FIG. 7 shows a method 700 of array element radiation pattern generation. The method 700 is generally implemented by any of the examples described herein. In an example, the 700 is implemented at least partly in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 702 generates, with a phased array of elements of an antenna system, an array element radiation pattern over a scan angle range, where the phased array of elements is spaced at a predetermined wavelength spacing. Illustrated processing block 704 reflects, with a reflector of the antenna system, the array element radiation pattern emitted from the phased array of elements to Earth. Illustrated processing block 706 establishes, based on a shape of the reflector, a predetermined magnification as a function of scan angle range so as to increase the field-of-view of the antenna system. Illustrated processing block 708 adjusts, based on the shape of the reflector, the array element radiation pattern, by increasing magnification relative to the scan angle range, to have a gain that increases with increases in scan angle relative to a boresight of the antenna system. Illustrated processing block 710 reflects, with the reflector, radiation from Earth to the phased array of elements. In some examples, the predetermined magnification is within a range from a negative magnification of −3 for small scan angles (e.g., from —half the maximum scan angle to half the maximum scan angle) up to a positive magnification of +2 for large scan angles (angles greater than half the maximum scan angle to the maximum scan angle, and angles less than —half the maximum scan angle to a —maximum scan angle), and is a function of scan angle range. For example, if the maximum scan angle is 60 degrees, the small scan angles would include from −30 to 30 degrees and the large scan angles would include −60 to −31 degrees and 31 to 60 degrees.

In some examples, the method 700 includes increasing, with the reflector, the scan angle range by a predetermined amount of degrees, wherein the shape of the reflector has a slope that is equal to half the amount of the predetermined amount of degrees for small scan angles (e.g., from —half the maximum scan angle to half the maximum scan angle) and transitions to less negative magnification at wider scan angles (angles greater than half the maximum scan angle to the maximum scan angle, and angles less than —half the maximum scan angle to a —maximum scan angle). For example, if the maximum scan angle is 60 degrees, the small scan angles would include from −30 to 30 degrees and the large scan angles would include −60 to −31 degrees and 31 to 60 degrees. In some examples, the reflector is a single off-set reflector. In some examples, the reflector is a single on-axis reflector. In some examples, the predetermined wavelength spacing that is configured for scanning from a −30 degree scan angle from the boresight to a 30 degree scan angle from the boresight, and the reflector has a predetermined magnification of −2 near the center or less to extend the −30 degree scan angle to a −60 degree scan angle from the boresight and the 30 degree scan angle to a 60 degree scan angle from the boresight.

In some examples, the phased array of elements are spaced at one wavelength apart. In some examples, the predetermined wavelength spacing is configured for scanning from a −20 degree scan angle from the boresight to a 20 degree scan angle from the boresight, and the reflector has a predetermined magnification of −3 or less to extend the −20 degree scan angle to a −60 degree scan angle from the boresight, and extend the 20 degree scan angle to a 60 degree scan angle from the boresight.

In some examples, the method 700 includes reflecting, with the reflector, the array element radiation pattern to have a first gain in a direction of Earth perimeter relative to the antenna system, and a second gain in a direction of Earth nadir relative to the antenna system, wherein the first gain is greater than the second gain. In some examples, the reflector has a substantially inverse parabolic shape, and the array element radiation pattern reflected by the reflector has a substantially uniform flux density on the Earth.

Further, the disclosure comprises additional examples as detailed in the following clauses below.

Clause 1. An antenna system comprising:

a phased array of elements spaced at a predetermined wavelength spacing, the phased array of elements being configured to generate an array element radiation pattern over a scan angle range; and a reflector to reflect the array element radiation pattern from the phased array of elements to earth, the reflector having a shape configured to establish a predetermined magnification as a function of scan angle range so as to increase a field-of-view of the antenna system, wherein the shape of the reflector is further configured to adjust the array element radiation pattern, by increasing magnification relative to the scan angle range, to have a gain that increases with increases in scan angle relative to a boresight of the antenna system, wherein the phased array of elements is positioned at a feed location to receive radiation from Earth reflected by the reflector.

Clause 2. The antenna system of clause 1, wherein the predetermined magnification is within a range from a negative magnification of −3 for small scan angles, up to a positive magnification of +2 for large scan angles at an edge of coverage.

Clause 3. The antenna system of Clause 1, wherein:

the reflector is configured to increase the scan angle range by a predetermined amount of degrees; and the shape of the reflector has a slope that is equal to half the predetermined amount of degrees for small scan angles and transitions to less negative magnification at wider scan angles.

Clause 4. The antenna system of Clause 1, wherein the reflector is a single off-set reflector.

Clause 5. The antenna system of Clause 1, wherein the reflector is a single on-axis reflector.

Clause 6. The antenna system of Clause 1, wherein:

the predetermined wavelength spacing is configured for scanning from a −30 degree scan angle from the boresight to a 30 degree scan angle from the boresight; and the reflector has a predetermined magnification of −2 near the center of the antenna system to extend the −30 degree scan angle to a −60 degree scan angle from the boresight and the 30 degree scan angle to a 60 degree scan angle from the boresight.

Clause 7. The antenna of Clause 6, wherein the phased array of elements are spaced at one wavelength apart.

Clause 8. The antenna of Clause 1, wherein:

the predetermined wavelength spacing that is configured for scanning from a −20 degree scan angle from the boresight to a 20 degree scan angle from the boresight; and the reflector has a predetermined magnification of −3 near the center to extend the −20 degree scan angle to a −60 degree scan angle from the boresight, and extend the 20 degree scan angle to a 60 degree scan angle from the boresight.

Clause 9. The antenna system of Clause 1, wherein:

the array element radiation pattern reflected by the reflector has a first gain in a direction of Earth perimeter relative to the antenna system, and a second gain in a direction of Earth nadir relative to the antenna system; and the first gain is greater than the second gain.

Clause 10. The antenna of Clause 1, wherein:

the reflector has a substantially inverse parabolic shape near the center and is less curved near an edge; and the array element radiation pattern reflected by the reflector has a substantially uniform flux density on the Earth.

Clause 11. A method comprising:

generating, with a phased array of elements of an antenna system, an array element radiation pattern over a scan angle range, wherein the phased array of elements is spaced at a predetermined wavelength spacing;

reflecting, with a reflector of the antenna system, the array element radiation pattern emitted from the phased array of elements to Earth;

establishing, based on a shape of the reflector, a predetermined magnification as a function of scan angle range so as to increase a field-of-view of the antenna system;

adjusting, based on the shape of the reflector, the array element radiation pattern, by increasing magnification relative to the scan angle range, to have a gain that increases with increases in scan angle relative to a boresight of the antenna system; and reflecting, with the reflector, radiation from Earth to the phased array of elements.

Clause 12. The method of Clause 11, wherein the predetermined magnification is within a range from a negative magnification of −3 for small scan angles up to a positive magnification of +2 for large scan angles, and is a function of scan angle range.

Clause 13. The method of Clause 11, further comprising:

increasing, with the reflector, the scan angle range by a predetermined amount of degrees, wherein the shape of the reflector has a slope that is equal to half the amount of the predetermined amount of degrees for small scan angles and transitions to less negative magnification at wider scan angles.

Clause 14. The method of Clause 11, wherein the reflector is a single off-set reflector.

Clause 15. The method of Clause 11, wherein the reflector is a single on-axis reflector.

Clause 16. The method of Clause 11, wherein:

the predetermined wavelength spacing that is configured for scanning from a −30 degree scan angle from the boresight to a 30 degree scan angle from the boresight; and the reflector has a predetermined magnification of −2 near the center or less to extend the −30 degree scan angle to a −60 degree scan angle from the boresight and the 30 degree scan angle to a 60 degree scan angle from the boresight.

Clause 17. The method of Clause 16, wherein the phased array of elements are spaced at one wavelength apart.

The method of Clause 11, wherein:

the predetermined wavelength spacing that is configured for scanning from a −20 degree scan angle from the boresight to a 20 degree scan angle from the boresight; and the reflector has a predetermined magnification of −3 or less to extend the −20 degree scan angle to a −60 degree scan angle from the boresight, and extend the 20 degree scan angle to a 60 degree scan angle from the boresight.

Clause 19. The method of Clause 11, further comprising:

reflecting, with the reflector, the array element radiation pattern to have a first gain in a direction of Earth perimeter relative to the antenna system, and a second gain in a direction of Earth nadir relative to the antenna system, wherein the first gain is greater than the second gain.

Clause 20. The method of Clause 11, wherein:

the reflector has a substantially inverse parabolic shape; and the array element radiation pattern reflected by the reflector has a substantially uniform flux density on the Earth.

Example sizes/models/values/ranges can have been given, although examples are not limited to the same. As manufacturing techniques (e.g., photolithography) mature over time, it is expected that devices of smaller size could be manufactured. In addition, well known power/ground connections to IC chips and other components can or cannot be shown within the figures, for simplicity of illustration and discussion, and so as not to obscure certain aspects of the examples. Further, arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

As used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. An antenna system comprising:

a phased array of elements spaced at a predetermined wavelength spacing, the phased array of elements being configured to generate an array element radiation pattern over a scan angle range; and a reflector to reflect the array element radiation pattern from the phased array of elements to Earth, the reflector having a shape configured to establish a predetermined magnification as a function of the scan angle range so as to increase a field-of-view of the antenna system, wherein the shape of the reflector is further configured to adjust the array element radiation pattern, by increasing magnification relative to the scan angle range, to have a gain that increases with increases in scan angle relative to a boresight of the antenna system, wherein the reflector is configured to increase the scan angle range by a predetermined amount of degrees, and further wherein the shape of the reflector has a slope that is equal to half the predetermined amount of degrees for small scan angles, wherein the phased array of elements is positioned at a feed location to receive radiation from the Earth reflected by the reflector.

2. The antenna system of claim 1, wherein the predetermined magnification is within a range from a negative magnification of −3 for the small scan angles, up to a positive magnification of +2 for large scan angles at an edge of coverage.

3. The antenna system of claim 1, wherein:

the shape of the reflector transitions to less negative magnification at wider scan angles.

4. The antenna system of claim 1, wherein the reflector is a single off-set reflector.

5. The antenna system of claim 1, wherein the reflector is a single on-axis reflector.

6. The antenna system of claim 1, wherein:
the predetermined wavelength spacing is configured for scanning from a −20 degree scan angle from the boresight to a 20 degree scan angle from the boresight; and
the predetermined magnification is −3 near the center to extend the −20 degree scan angle to a −60 degree scan angle from the boresight, and extend the 20 degree scan angle to a 60 degree scan angle from the boresight.

7. The antenna system of claim 1, wherein:
the array element radiation pattern reflected by the reflector has a first gain in a direction of Earth perimeter relative to the antenna system, and a second gain in a direction of Earth nadir relative to the antenna system; and
the first gain is greater than the second gain.

8. The antenna system of claim 1, wherein:
the reflector has a substantially inverse parabolic shape near the center and is less curved near an edge; and
the array element radiation pattern reflected by the reflector has a substantially uniform flux density on the Earth.

9. An antenna system comprising:
a phased array of elements spaced at a predetermined wavelength spacing, the phased array of elements being configured to generate an array element radiation pattern over a scan angle range; and
a reflector to reflect the array element radiation pattern from the phased array of elements to Earth, the reflector having a shape configured to establish a predetermined magnification as a function of the scan angle range so as to increase a field-of-view of the antenna system, wherein the shape of the reflector is further configured to adjust the array element radiation pattern, by increasing magnification relative to the scan angle range, to have a gain that increases with increases in scan angle relative to a boresight of the antenna system,
wherein the phased array of elements is positioned at a feed location to receive radiation from the Earth reflected by the reflector,
further wherein the predetermined wavelength spacing is configured for scanning from a −30 degree scan angle from the boresight to a 30 degree scan angle from the boresight; and
further wherein the predetermined magnification is −2 near the center of the antenna system to extend the −30 degree scan angle to a −60 degree scan angle from the boresight and the 30 degree scan angle to a 60 degree scan angle from the boresight.

10. The antenna system of claim 9, wherein the phased array of elements are spaced at one wavelength apart.

11. A method comprising:
generating, with a phased array of elements of an antenna system, an array element radiation pattern over a scan angle range, wherein the phased array of elements is spaced at a predetermined wavelength spacing;
reflecting, with a reflector of the antenna system, the array element radiation pattern emitted from the phased array of elements to Earth;
establishing, based on a shape of the reflector, a predetermined magnification as a function of the scan angle range so as to increase a field-of-view of the antenna system;
adjusting, based on the shape of the reflector, the array element radiation pattern, by increasing magnification relative to the scan angle range, to have a gain that increases with increases in scan angle relative to a boresight of the antenna system;
reflecting, with the reflector, radiation from the Earth to the phased array of elements; and
increasing, with the reflector, the scan angle range by a predetermined amount of degrees, wherein the shape of the reflector has a slope that is equal to half the amount of the predetermined amount of degrees for small scan angles.

12. The method of claim 11, wherein the predetermined magnification is within a range from a negative magnification of −3 for the small scan angles up to a positive magnification of +2 for large scan angles, and is based on the function of the scan angle range.

13. The method of claim 11,
wherein the shape of the reflector transitions to less negative magnification at wider scan angles.

14. The method of claim 11, wherein the reflector is a single off-set reflector.

15. The method of claim 11, wherein the reflector is a single on-axis reflector.

16. The method of claim 11, wherein:
the predetermined wavelength spacing is configured for scanning from a −30 degree scan angle from the boresight to a 30 degree scan angle from the boresight; and
the predetermined magnification is −2 near the center or less to extend the −30 degree scan angle to a −60 degree scan angle from the boresight and the 30 degree scan angle to a 60 degree scan angle from the boresight.

17. The method of claim 16, wherein the phased array of elements are spaced at one wavelength apart.

18. The method of claim 11, wherein:
the predetermined wavelength spacing that is configured for scanning from a −20 degree scan angle from the boresight to a 20 degree scan angle from the boresight; and
the predetermined magnification is −3 or less to extend the −20 degree scan angle to a −60 degree scan angle from the boresight, and extend the 20 degree scan angle to a degree scan angle from the boresight.

19. The method of claim 11, further comprising:
reflecting, with the reflector, the array element radiation pattern to have a first gain in a direction of Earth perimeter relative to the antenna system, and a second gain in a direction of Earth nadir relative to the antenna system, wherein the first gain is greater than the second gain.

20. The method of claim 11, wherein:
the reflector has a substantially inverse parabolic shape; and
the array element radiation pattern reflected by the reflector has a substantially uniform flux density on the Earth.

* * * * *